United States Patent [19]

Shinohara et al.

[11] 4,008,692
[45] Feb. 22, 1977

[54] VEHICLE-MOUNTED GASEOUS FUEL GENERATOR

[75] Inventors: Hiroshi Shinohara, Okazaki; Kunihiko Masunaga, Toyota; Shigeo Murakami, Okazaki; Kazuhiko Ishiguro, Toyota, all of Japan

[73] Assignee: Toyota Jidosha Kogyo Kabushiki Kaisha, Toyota, Japan

[22] Filed: Nov. 4, 1974

[21] Appl. No.: 520,936

[30] Foreign Application Priority Data

Nov. 6, 1973 Japan .............. 48-124680

[52] U.S. Cl. .................. 123/3; 123/1 A; 123/122 E; 123/133; 23/281; 48/95
[51] Int. Cl.² ........................ F02B 43/00
[58] Field of Search ........... 123/119 E, 122 E, 133, 123/3, 1 A; 261/144, 145; 48/107, 95; 23/281, 211

[56] References Cited

UNITED STATES PATENTS

| | | | |
|---|---|---|---|
| 2,821,843 | 2/1958 | Mengelkamp | 123/122 E |
| 3,635,200 | 1/1972 | Rundell | 123/122 E |
| 3,682,142 | 8/1972 | Newkirk | 123/3 |
| 3,828,736 | 8/1974 | Koch | 123/119 E |
| 3,897,225 | 7/1975 | Henkel | 123/3 |
| 3,920,416 | 12/1973 | Houseman | 123/3 |

*Primary Examiner*—Ronald H. Lazarus
*Attorney, Agent, or Firm*—Brisebois & Kruger

[57] ABSTRACT

Vehicle-mounted gaseous fuel generator consisting of a primary heat-exchange chamber holding coiled pipes for separately preheating a liquid hydrocarbon and water, a secondary heat-exchange chamber similarly equipped with coiled pipes utilizing the heat of the engine exhaust to heat and vaporize each of the fuel materials which have been preheated in the primary heat-exchange chamber, a reaction-reforming chamber composed of an outer reaction chamber for blending the hydrocarbon vaporized in the secondary heat exchange chamber with air for partial oxidation and an inner steam-reforming catalyst layer through which the combined flow of the partially oxidized gas and the vaporized water is passed to be transformed into an inflammable gas, and an apparatus for collecting the inflammable gas in a gas-collector and transmitting it via the primary heat-exchange chamber to the carburetor of the engine.

4 Claims, 2 Drawing Figures

VEHICLE-MOUNTED GASEOUS FUEL GENERATOR

BACKGROUND OF THE INVENTION

In recent years the emissions from external and internal combustion engines, mainly carbon monoxide, hydrocarbons and nitrogen oxides, have been receiving serious social attention as the major source of air pollution. Various methods have been studied industrially to control the generation of these harmful gases and different devices for the practical application of these methods have been developed.

Various measures are being taken, such as Electronic Fuel Injection, in which a sensor mounted on a vehicle detects its running condition, which is assessed by a computer; Exhaust Gas Recirculation systems, in which the exhaust gas is recirculated into the suction system; or Air Injection, in which the air sucked into the air-cleaner by the air pump is controlled by a bypass valve and ejected to the rear of the exhaust valve. These measures, however, cannot be called perfect; they are nothing more than temporary stopgaps.

Meanwhile, in an effort to abate harmful auto emissions, use of natural gas as a secondary fuel to the vehicle is being tried, but only with limited success.

For instance, as R.W. Mcjone and R.J. Corbel report in an SAE paper No. 700078 (published 1971), gasoline-burning vehicles have been equipped with a fuel-exchanger, by which the gasoline and the natural gas are initially used in combination, and the fuel supply is switched to natural gas alone when a steady running state is established. At the present stage, however, this approach requires large tanks for the transportation of the materials; a tremendous investment has to be made for the installation of storage facilities; and the running range of such vehicles is limited on account of the oil supply thereto.

According to the SAE Paper No. 720670 written by Marc S. New Kivk, International Materials has developed a Boston Fuel-Reforming Car, in which carbon is precipitated within a reactor by cracking of hydrocarbons under high-temperature and high-pressure conditions without any catalyzer, and the carbon monoxide and steam generated by the reaction with steam are turned into hydrogen and carbonic gas. As the reaction has to take place at temperatures higher than 950°C and at a reactor pressure of 55.8 kg/cm$^2$, this method requires materials which can stand high temperature and high pressure; and as the generated hydrogen fuel has to be burned to heat up the reactor, much money is needed for fuel. Since it involves the generation of carbon monoxide, this method involves the risk that this harmful gas will leak out in the event of an accident. A reservoir for the generated gas has to be provided and accordingly the vehicle might as well be equipped with a hydrogen cylinder, which poses an exceedingly high hazard. Since such a cylinder is of the high pressure type, naturally the pump for supplying the material has to be a high pressure pump, which inevitably increases the cost.

SUMMARY OF THE INVENTION

The present invention relates to a vehicle-mounted gaseous fuel generator, more specifically to a gaseous fuel generator consisting of a device for transforming liquid hydrocarbons such as heating oil, light oil, gasoline or alcohol into carbon monoxide, low-class hydrocarbons and oxygen-containing compounds through partial oxidation and a device for generating a gaseous fuel through a stem-reforming reaction.

Figure 1:
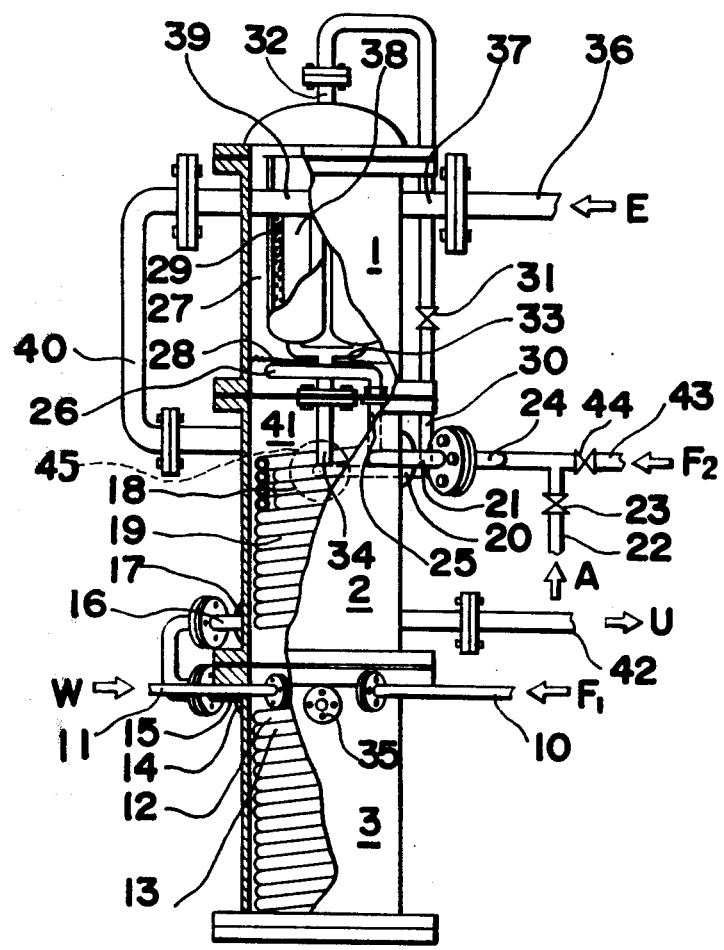
FIG. 1 is an elevational view schematically showing a partially cutaway vehicle-mounted gaseous fuel generator according to the present invention.

In these drawings $F_1$, $F_2$ indicate hydrocarbons and W indicates water; U indicates the exhaust gas; E the emission from the engine; 1 the reaction-reforming chamber; 2 the secondary heat-exchange chamber; 3 the primary heat-exchange chamber; 10 the hydrocarbon inlet; 3 the primary heat-exchange chamber; 10 the hydrocarbon inlet; and 11 the water inlet. Reference numerals 12, 13, 18, 19 indicate coiled pipes; 14, 15, 16, 17, 24, 25, 30, 34, 40 indicate tubes; and 20, 21 indicate the outlets for gasified hydrocarbon. Reference numeral 22 indicates the air inlet, 26 the nozzle; 27 the partial-oxidation chamber; 28 a metal screen which acts as a partial-oxidation catalyzer; and 29 the steam-reforming catalyzer layer. Reference numerals 31, 44 indicate valves; 35 the outlet for gaseous fuel; 36 the inlet for the exhaust gas from the engine; 37, 39 indicate main pipes; and 42 indicates the outlet for the exhaust gas.

DETAILED EXPLANATION OF THE INVENTION

The vehicle-mounted gaseous fuel generator according to the present invention has been developed to overcome the various drawbacks mentioned above. The following are the features of this generator.

First, the generator according to the present invention, which works at low temperature and low pressure and renders it unnecessary for the vehicle to carry a cylinder, involves a low hazard and can produce a gaseous fuel easily and continuously.

Second, the heat is fully utilized. Hydrocarbon and water, i.e., the materials used in producing the fuel are vaporized by utilizing the heat of the engine exhaust; heat exchange takes place in the catalyzer layer utilizing the reaction between hydrocarbon and steam, and by utilizing the heat generated through partial oxidation the temperature of the catalyzer layer for steam reforming is maintained.

Third, the reaction rates at which partial oxidation and steam reforming take place are enhanced; and steam reforming is carried out in a reducing atmosphere by utilizing the gas generated through partial oxidation.

Fourth, the engine oil for lubricating the engine is not diluted and can last for a long time.

Fifth, one half of the piping in the heat-exchanger is used for introducing the exhaust gas and the other half of it is used for discharging the exhaust gas, thereby making the most of the heat of the exhaust gas circulated through the same pipe.

Figure 2:
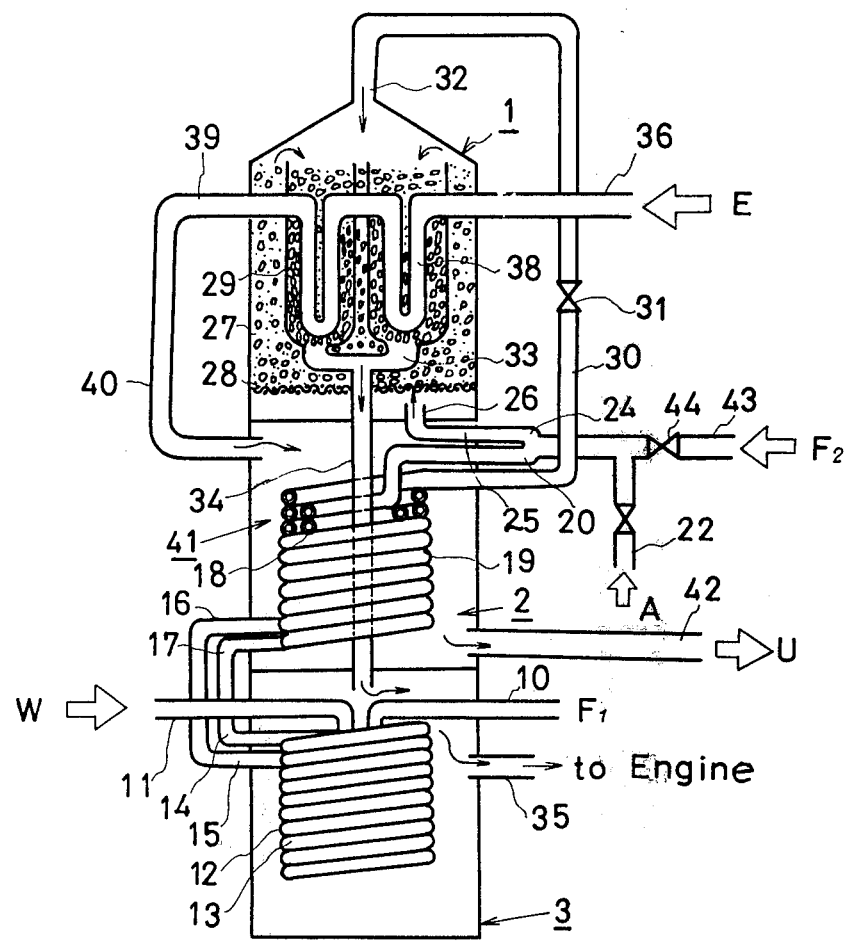
FIG. 2 is a schematic view of the device shown in FIG. 1 with the reaction-reforming chamber shown in section.

FIG. 1 is an elevational view showing our new fuel generator, with the casing partially broken away; and FIG. 2 is a schematic view showing the two heat exchangers with the casing completely removed and the reaction-reforming chamber in schematic axial section.

As illustrated in the drawings, the gaseous fuel generator comprises a slender cylindrical reactor, which consists of three parts: the reaction-reforming chamber 1, at the top; the secondary heat-exchange chamber 2, in the middle; and the primary heat-exchange chamber 3, at the bottom.

The hydrocarbon $F_1$ enters through the inlet 10 and the water W enters through the inlet 11. A specified amount of each material is supplied by pumping to the primary heat-exchange chamber 3 at the bottom of the cylindrical reactor and then introduced into the internal coiled pipes 12, 13, which constitute the primary heat-exchange chamber 3. Pipes are located at several levels and partition walls are provided between the pipes. Heat exchange takes place as a result of the materials being heated by the heat of the generated gas. The hydrocarbon heated in the primary heat-exchange chamber 3 passes via the tubes 15, 16 into the secondary heat-exchange chamber 2, to be heated again in the coiled pipe 18. Meanwhile the water heated in the primary heat-exchange chamber 3, and partially transformed into steam passes like the hydrocarbon via the tubes 14, 17 into the secondary heat-exchange chamber 2. The hydrocarbon which has been heated to a certain extent by heat exchange in the primary heat-exchange chamber 3 is further heated in the coiled pipe 18 by the engine exhaust and is fully vaporized. Fully-gasified hydrocarbon goes to the outlet 21 of the secondary heat-exchange chamber 2, where it is mixed with the air A supplied through the inlet 22 in the tube 24. The obtained mixture enters the tube 25, is ejected out of the nozzle 26, and reacts in the partial-oxidation chamber 27.

The catalyzer for partial oxidation is set on a metal screen 28 which concurrently serves as the filter. The gas generated by partial oxidation is introduced to the steam-reforming catalyzer layer 29 of the reaction-reforming chamber 1 at the top of the generator.

On the other hand, the water fully vaporized in the secondary heat-exchange chamber 2 passes out through the outlet 45 of the secondary heat-exchange chamber 2, and via the tube 30 and the valve 31, it reaches the nozzle 32 of the reaction-reforming chamber 1 through which it is ejected into the reaction-reforming chamber 1, where it reacts with the nonreacted hydrocarbon obtained through partial oxidation and the low-class hydrocarbon in the steam-reforming catalyzer layer 29.

The gas thus generated is collected in the gas collector 33; introduced through the tube 34 into the primary heat-exchange chamber 3; and is expelled therefrom through the outlet 35 into the engine.

The steam-reforming catalyzer layer 29 has a heat-exchanger 38 utilizing the heat of the engine exhaust inserted therein.

The exhaust gas E, entering through the inlet 36 into the main pipe 37, travels in the heat-exchanger 38 through branch pipes, each having two sections one of which leads the exhaust gas away from the main pipe, while the other returns the exhaust gas thereto. Then it passes from the main pipe 39 via the tube 40 into the part 41 of the secondary heat-exchange chamber 2, where it heats the coils therein and then is discharged through the outlet 42 into the atmosphere.

When the engine is first started, the hydrocarbon $F_2$ enters through the inlet 43 and the valve 44, is mixed with the air from the inlet 22, and, passing through the tube 25, enters the reaction-reforming chamber 1 through the nozzle 26.

It goes without saying that the method of supplying the materials and the method of controlling the temperature in the gaseous fuel generator of the present invention may be modified within the scope of the claims, without departing from the basic principles of the present invention.

What is claimed is:

1. A gaseous fuel generator for mounting on a vehicle provided with a supply of liquid hydrocarbon, a supply of water and an internal combustion engine equipped with a carburetor and discharging an exhaust gas, said generator comprising
   a primary heat exchanger (3) holding separate coiled pipes (12, 13) for separately receiving and heating liquid hydrocarbon and water provided by said supplies,
   a secondary heat-exchanger (2) holding separate coiled pipes connected to the coiled pipes (12, 13) of said primary heat exchanger to receive hydrocarbon and water respectively therefrom, means for conducting the exhaust gas from said engine to said secondary heat exchanger (2) to heat and vaporize said hydrocarbon and water,
   a reaction-reforming chamber (1) comprising an outer partial oxidation chamber (27) containing an outer catalyzer layer connected to receive hydrocarbon vaporized in said secondary heating chamber and air and partially oxidize said vaporized hydrocarbon, and an inner steam-reforming catalyzer layer (29) connected to receive both said partially oxidized hydrocarbon from said outer chamber and vaporized water from said secondary heating chamber, and transform them into an inflammable gas, and
   means (34, 35) for collecting said inflammable gas and transmitting it through said primary heat exchanger to said carburetor.

2. A vehicle-mounted gaseous fuel generator as claimed in claim 1, which comprises a cylinder integrally holding said reaction-reforming chamber at its top, the secondary heat-exchange chamber 2 in its center and the primary heat-exchanger chamber 3 at its bottom.

3. A vehicle-mounted gaseous fuel generator as claimed in claim 1, wherein the reaction-reforming chamber comprises a cylinder holding an outer layer of a catalyzer for partial oxidation, and an inner mass of a steam-reforming catalyzer, and in which the steam-reforming catalyzer layer comprises several sections, each of which is equipped with a heat-exchanger utilizing the heat of engine exhaust.

4. A vehicle-mounted gaseous fuel generator as claimed in claim 3, in which the heat-exchanger in each section of the steam-reforming catalyzer comprises a pipe which is internally divided into two parts, one part serving to introduce the exhaust gas and the other part serving to discharge the exhaust gas.

* * * * *